United States Patent

Hunter et al.

[11] Patent Number: 6,074,126
[45] Date of Patent: Jun. 13, 2000

[54] STRUCTURAL INTERLOCK FOR INHIBITING RELATIVE ROTATION BETWEEN MATING ELEMENTS

[75] Inventors: David H. Hunter, Cheshire, Conn.; Francis E. Byrnes, White Plains, N.Y.; Kevin S. French, Trumbull, Conn.

[73] Assignee: Sikorsky Aircraft Corporation, Stratford, Conn.

[21] Appl. No.: 08/953,744

[22] Filed: Oct. 17, 1997

[51] Int. Cl.$^7$ ........................................................ F16D 1/00
[52] U.S. Cl. ........................... 403/404; 403/79; 403/157; 403/282; 411/150
[58] Field of Search ........................... 411/10, 150, 154, 411/161; 403/79, 157, 150, 154, 156, 404, 282, 281, 278; 29/505, 521

[56] References Cited

U.S. PATENT DOCUMENTS

| 1,850,242 | 3/1932 | Olson | 411/154 X |
|---|---|---|---|
| 3,923,349 | 12/1975 | Herbst | 403/79 X |
| 4,392,296 | 7/1983 | Kanamaru et al. | 403/278 X |
| 4,684,280 | 8/1987 | Dirkin et al. | 403/79 X |
| 4,786,202 | 11/1988 | Arnold et al. | 403/79 |
| 5,525,001 | 6/1996 | Perkins | 403/79 X |

FOREIGN PATENT DOCUMENTS

| 493145 | 1/1992 | European Pat. Off. . |
|---|---|---|
| 483049 | 4/1992 | European Pat. Off. . |
| 2426831 | 12/1979 | France . |
| 1931300 | 1/1970 | Germany . |
| 842244 | 7/1960 | United Kingdom . |

*Primary Examiner*—Brian K. Green
*Assistant Examiner*—William L. Miller
*Attorney, Agent, or Firm*—Brian A. Collins

[57] ABSTRACT

A structural interlock (40) for inhibiting relative rotation between mating elements (20, 42) characterized by a plurality of grooves (50) being formed in one of the mating elements, and a mechanism (60) for producing a nominal contact pressure on the contact area ($A_1$ thru $A_8$) between the mating element, which contact pressure elastically deforms the other of the mating elements into the grooves (50), and is less than the material yield strength of either of the mating elements. In the preferred embodiment, the grooves (50) are radially oriented and an applied compressive load produces a nominal contact pressure which is about 80% of the material yield strength.

10 Claims, 3 Drawing Sheets

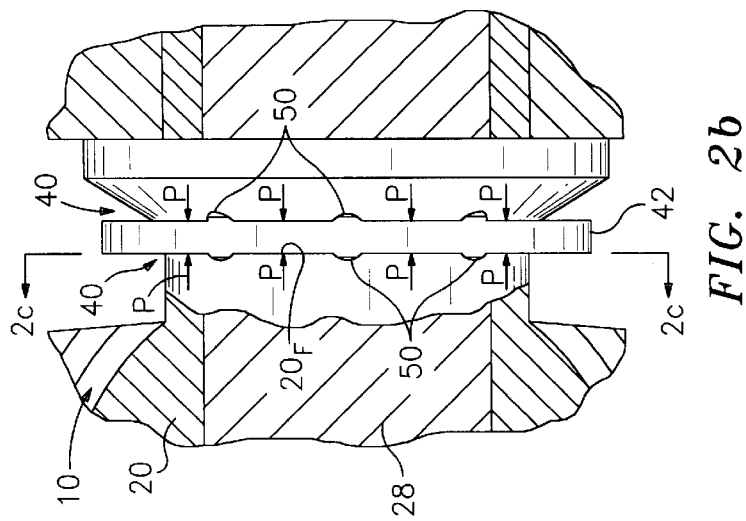
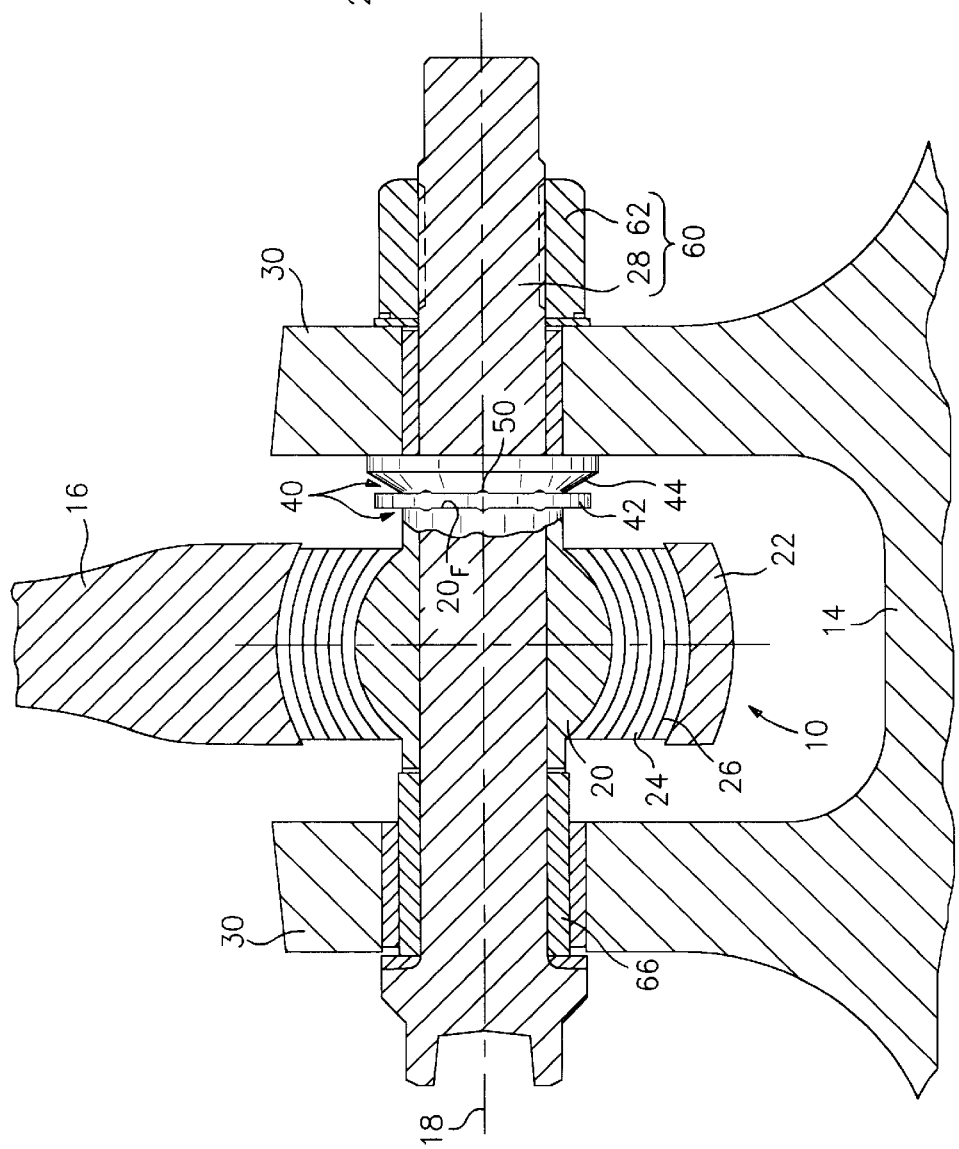
FIG. 2b
FIG. 2a

STRUCTURAL INTERLOCK FOR INHIBITING RELATIVE ROTATION BETWEEN MATING ELEMENTS

TECHNICAL FIELD

This invention relates to structural interlocks for inhibiting relative rotation between mating elements, and, more particularly, to an improved structural interlock for inhibiting rotation of a bearing race relative to a connecting pin of a clevis joint.

BACKGROUND OF THE INVENTION

To facilitate assembly, maintenance and/or repair of bearing assemblies, it is advantageous to secure the bearing races to the respective mating elements with a minimum degree of structural complexity. For example, a bearing race which must be press fit over a connecting pin or shaft is more difficult and costly to assemble/maintain than one which employs a simple structural interlock, e.g., a slot and key arrangement, to effect the necessary engagement. Furthermore, to prevent fretting or chaffing between elements, it is desirable to minimize or essentially negate relative motion between the bearing race and its mating element. That is, fretting wear is minimized by a structural interlock which causes the bearing race and the respective mating element to move as a unitary component.

Prior art bearing assemblies employ various structural interlocks which rely on friction, mechanical interference or some combination thereof. For example, it is common practice to rely on an axial clamp-up force to generate sufficient friction between a bearing and its mating element to counteract motion induced by torque. For applications wherein sufficient friction cannot be induced, the structural interlock may be effected by mechanical interference such as mating flats to rotationally couple the bearing race to its mating element. While this arrangement provides structural simplicity, machining and/or manufacturing tolerances produce an imperfect fit which can produce fretting.

A structural interlock which employs both friction and mechanical interference is depicted in FIG. 1a. More specifically, FIG. 1a depicts an elastomeric bearing 100 for accommodating relative motion between first and second elements 104 and 106, respectively, about an axis of rotation 108. The elastomeric bearing 100 is conventional and comprises an inner race 110, an outer race 112 and a plurality of alternating layers of elastomer and non-resilient metallic shims, 114 and 116, respectively. The inner race 110 is disposed about a connecting pin 118 which mounts between a pair of lugs 120 of the first element 104, and the outer race 112 is integrally formed in combination with the second element 106. More specifically, the inner race 110 is rotationally fixed relative to the lugs 120 by means of a structural interlock 124 formed between an end face $110_F$ of the inner race 110 and a press fit bushing 128 of one of the lugs 120.

In FIGS. 1a and 1b, the structural interlock 124 comprises serrate teeth 130 forming the end face $110_F$ of the inner race 110 which serrate teeth 130 engage the bushing 128 upon clamp-up of the connecting pin 118. That is, the serrate teeth 130, which comprise a harder material than the bushing 128, plastically deform the bushing 128 upon application of an axial clamp-up force P. As such, a mechanical and frictional interlock is produced to prevent relative rotation between the inner race 110 of the elastomeric bearing 102 and the lugs 120, and, consequently, between the inner race 110 and the connecting pin 118. Accordingly, the inner race 110 is held stationary with respect to the connecting pin 118 so as to abate fretting wear.

While the structural interlock 124 described above is readily fabricated and facilitates assembly, the serrate teeth 130 plastically deform the bushing 128 such that it must be replaced following each event of repair/maintenance, e.g., disassembly of the clevis joint 100 or replacement of the elastomeric bearing 102. While such disposal is typically deemed acceptable due to the relatively low cost of conventional bushings, more recently, it is desirable to employ cold-worked bushings which produce beneficial fatigue effects. More specifically, such cold-worked bushings are initially undersized relative to its receiving aperture and radially expanded or cold-worked into the aperture. Such cold-working produces residual stresses which improve the strength and fatigue life of the bushing/aperture.

In view of this installation procedure, it will be appreciated that such bushings are not intended for applications requiring frequent replacement. For example, each time a bushing is replaced rework of the aperture will be required. Furthermore, a slightly larger bushing will be required relative to the bushing it replaced. Accordingly, in addition to rework operations, a multiplicity of bushings must be held in inventory to ensure that the proper size bushing is available for replacement.

A need, therefore, exists for a structural interlock which inhibits relative rotation between mating elements while providing structural simplicity for ease of assembly, repair and/or maintenance.

SUMMARY OF THE INVENTION

It is an object of the present invention to provide a structural interlock for inhibiting relative rotation between mating elements which facilitates assembly, repair and/or maintenance.

It is another object of the present invention to provide such a structural interlock which produces mechanical interference to inhibit rotation without plastically deforming either of the mating elements.

These and other objects are achieved by a structural interlock for inhibiting relative rotation between mating elements characterized by a plurality of grooves being formed in one of the mating elements, and a means for producing a nominal contact pressure on the contact area between the mating elements, which contact pressure elastically deforms the other of the mating elements into the grooves, and is less than the material yield strength of either of the mating elements. In the preferred embodiment, the grooves are radially oriented and an applied compressive load produces a nominal contact pressure which is about 80% of the material yield strength.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 1b is a cross-sectional view taken substantially along line 1b—1b of FIG. 1a;

FIG. 2a depicts a partially broken away plan view of a clevis joint and a structural interlock according to the present invention for inhibiting relative rotation between an inner race of an elastomeric bearing and a locking washer;

FIG. 2b is an enlarged view of the structural interlock according to the present invention for depicting the structural interaction between the locking washer and a plurality of grooves formed in the an end face of the inner race;

BEST MODE FOR CARRYING OUT THE INVENTION

Figure 1B:
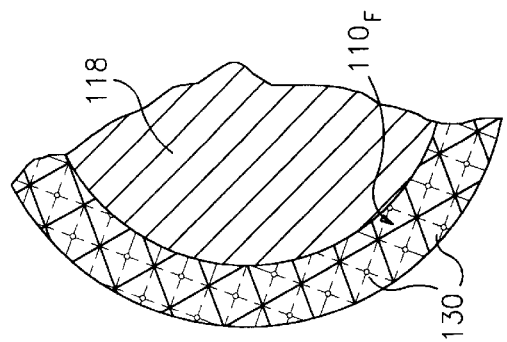
Figure 1A:
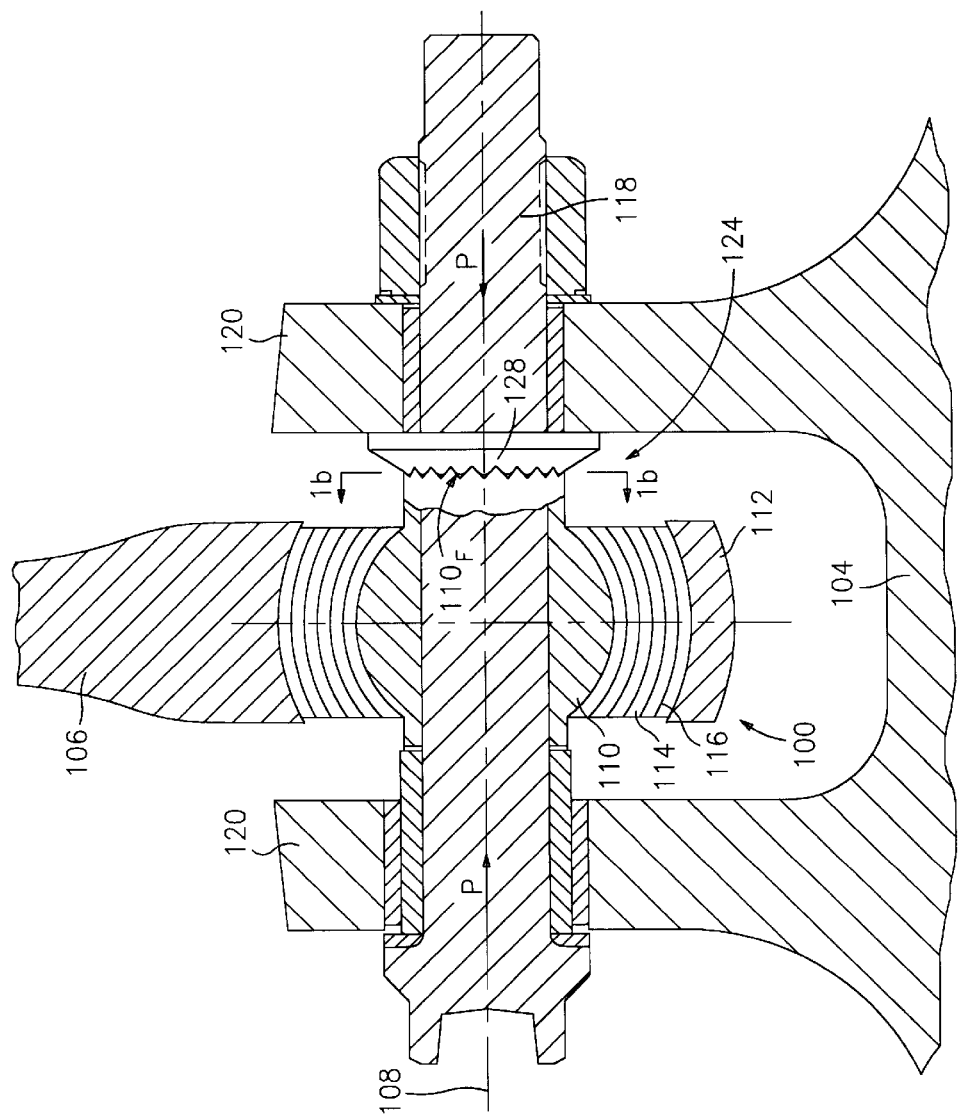
FIG. 1a is a partially broken away plan view of a clevis joint and a prior art structural interlock employed therein for inhibiting rotational motion between mating elements.

Referring now to the drawings wherein like reference characters identify corresponding or similar elements throughout the several views, FIG. 2a depicts an elastomeric bearing 10 for accommodating relative motion between first and second components 14 and 16, respectively, about an axis of rotation 18. The elastomeric bearing 10 is conventional and comprises an inner race 20, an outer race 22 and a plurality of alternating layers of elastomer and non-resilient metallic shims, 24 and 26, respectively. The inner race 20 is disposed about a connecting bolt 28 which mounts between a pair of lugs 30 of the first component 14, and the outer race 22 is integrally formed in combination with the second component 16. More specifically, the inner race 20 is rotationally fixed relative to the lugs 30 by means of structural interlocks 40 formed, in seriatim, between (i) the inner race 20 of the elastomeric bearing 10 and a locking washer 42, and (ii) the locking washer 42 and a cold-worked bushing 44. Functionally, the structural interlocks 40 serve to prevent relative rotation between the inner race 20 and the lugs 30, and, consequently, between the inner race 20 and the connecting pin 28. Accordingly, the inner race 20 is held stationary with respect to the connecting pin 28 so as to abate fretting wear.

In the broadest sense of the invention, and referring to FIGS. 2a through 2d, each structural interlock 40 is characterized by a plurality of grooves 50 formed in one of the mating elements, and a means 60 (FIG. 2a) for producing a nominal contact pressure which (i) elastically deforms the other of the mating elements into the grooves 50, and (ii) is less than the material yield strength of either of the mating elements, whichever is lower. Insofar as each structural interlock 40 is essentially identical, the following discussion will only describe the structural interlock 40 defined between the inner race 20 of the elastomeric bearing 10, and the locking washer 42 (not shown in FIG. 2c).

In the described embodiment, the structural interlock 40 is characterized by a plurality of grooves 50 disposed in an end face $20_F$ of the inner race 20. Preferably, an even number of the radially oriented grooves 50 are produced to facilitate fabrication and provide a predictable structural interlock. That is, with respect to the former, a wheel cutter can readily produce a pairs of radially oriented grooves 50 with each pass along the end face $20_F$. With respect to the latter, a radial orientation of the grooves 50 ensures that deformation of the locking washer 42 is uniform and, therefore, the anti-rotational or torque reacting capabilities of the structural interlock 40 are predicable, i.e., may be defined by calculation. The described embodiment depicts eight (8) radially oriented grooves 50 (best seen in FIG. 2c), though, the precise number, width and length of each groove 50 will vary depending upon several variables including the magnitude of torque to be reacted by the structural interlock 40. Subsequent paragraphs will describe a methodology which governs the number and geometry of grooves 50.

In the described embodiment, a compressive load P is produced by torquing a nut 62 (FIG. 2a) which engages the connecting bolt 28, thereby stacking a sleeve 66, the inner race 20, and the locking washer 42 against the cold-worked bushing 44. The compressive load P produces a nominal pressure on the contact area $A_1$ thru $A_8$, i.e., the total surface area between the grooves 50, which is within a minimum and maximum range. At minimum, the resultant nominal pressure produces a localized bulging of the locking washer 42 (best seen in detail FIG. 2d) into the groove 50 so as to create a shear plane $S_P$ through the locking washer material. It should be noted that reference to the term or phase "bulging" or "elastic deformation into the grooves 50" is a relative term which defines the resultant deforming effect. That is, the bulging occurs as a result of the locking washer 42 thinning in the areas corresponding to the contact areas $A_1$ thru $A_8$, while the locking washer 42 in the areas corresponding to the grooves 50 remains essentially unaltered in thickness. Consequently, one may view the net effect as a bulging or deformation into the grooves 50. Notwithstanding the relative effects, such material deformation has the effect of creating mechanical interference or a mechanical interlock. In the preferred embodiment, the resultant pressure should produce at least about 0.0005 inches/inch of nominal compressive strain in the locking washer 42. At maximum, the resultant pressure is less than the yield strength of the materials employed to fabricate the inner race 20 or the locking washer 42 and, preferably, the resultant pressure is less than about 80% of the yield strength. As such, by delimiting the resultant pressure, the deformation of materials remains in the elastic range without experiencing plastic or permanent deformation.

Futhermore, in the preferred embodiment, the locking washer 42 is fabricated from a material having a lower yield strength than the mating inner race 20. As such, should the contact pressure means 60 inadvertently exceed the yield strength of the locking washer 42 by, for example, a small margin, plastic deformation or damage will occur in the locking washer 42. The locking washer 42, which is far less costly than the elastomeric bearing 10, therefore, functions as a sacrificial member to guard against compressive loads which may be damaging.

It will be appreciated that the structural interlock 40 produces both frictional engagement and mechanical interference along the mating or contact plane $M_P$ of the inner race 20 and the locking washer 42. The torque reacting capability of the structural interlock 40, therefore, is a function of the frictional and mechanical contributions made by the total contact area between the grooves 50 and the groove geometry, respectively. The contribution made by friction is principally a function of the compressive load P, the coefficient of friction (static) and the radius of the frictional force vector measured from the rotational axis. The contribution made by mechanical interference is predominately a function of the shear strength of the material and the geometry, i.e., length and width, of each groove 50.

For the described embodiment, equations 1.0, 2.0 and 3.0, provided below, roughly approximate the torque reacting capability of the structural interlock 40.

$$T_{SI}=T_{Friction}+T_{Interference} \qquad 1.0$$

$$T_{Friction}=P\mu R_M \qquad 2.0$$

$$T_{Interference}=n\Sigma_{S.Allow}(w)(l)R_M \qquad 3.0$$

wherein, $T_{SI}$ is the torque reacting capability of the structural interlock 40;

$T_{Friction}$ is the torque contribution made by friction;

$T_{Interference}$ is the torque contribution made by mechanical interference;

P is the compressive load between the mating elements;

$\mu$ is the static coefficient of friction between the mating elements;

$R_M$ is the radius of the frictional force vector measured from the rotational axis, which in the described embodiment is equal to $(R_O+R_I)/2$;

n is the number of grooves;

$\Sigma_{S.Allow}$ is the shear allowable of the material being deformed into the grooves, which in the described embodiment is the shear allowable of the locking washer 42;

w is the width of each groove; and l is the length of each groove.

Figures 2C, 2D, 3:
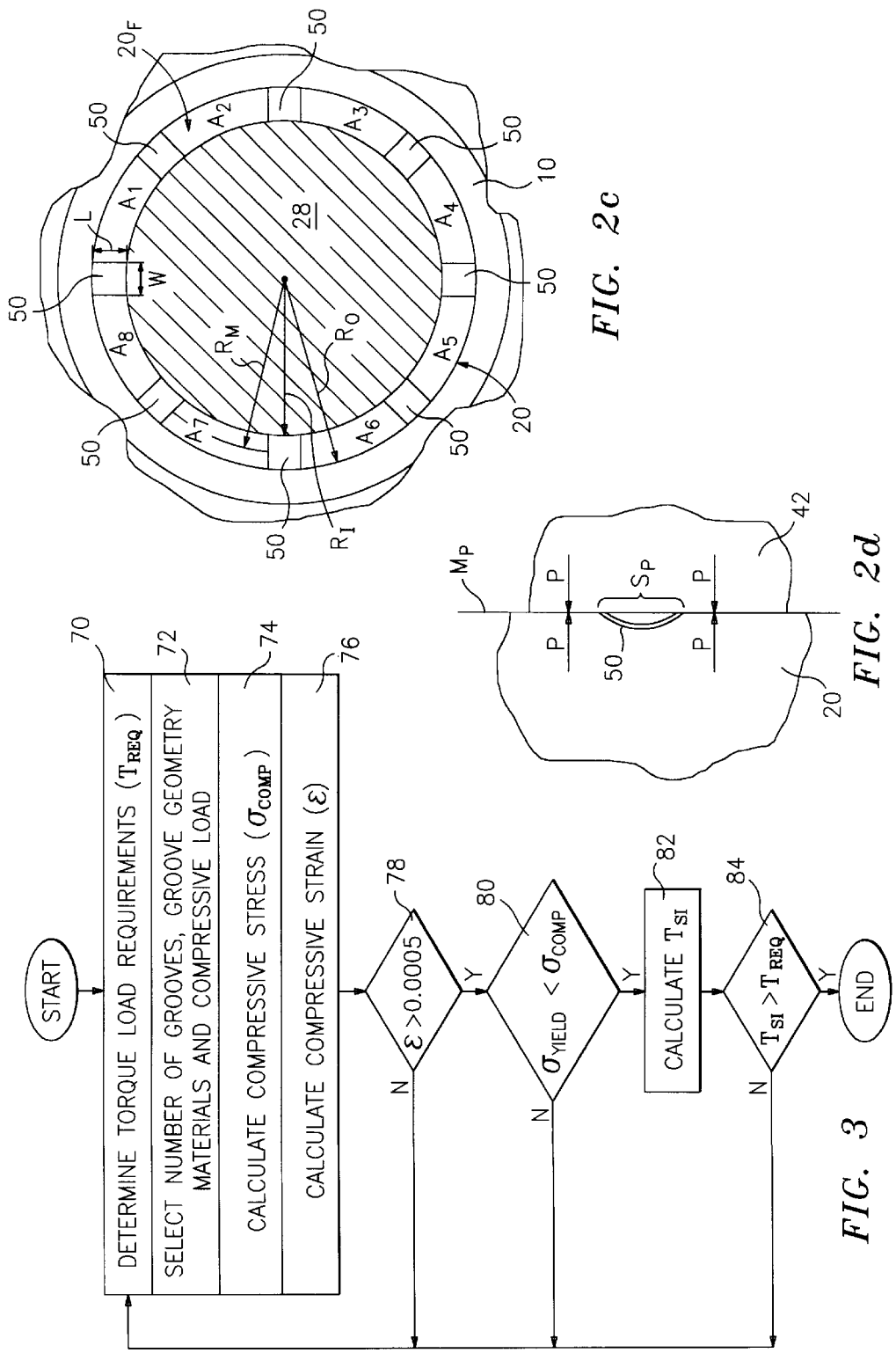
FIG. 2c depicts a cross-sectional view taken substantially along line 2c—2c of FIG. 2b.
FIG. 2d is a detail view illustrating the effective elastic deformation of the locking washer into one of the grooves.
FIG. 3 is a flow diagram of the methodology for designing a structural interlock according to the present invention.

FIG. 3 is a flow diagram which outlines the steps or methodology for properly selecting the materials and/or geometry to produce a structural interlock of the type described above. This methodology can be suitably modified for application to other structural assemblies wherein it is desired that elements mate without slippage or movement. In step 70, the torque load requirements $T_{REQ}$ of the structural interlock is determined. Generally, the torque loads acting on a bearing assembly are known or can be determined. Next, in step 72, a groove geometry, groove number, material for each of the mating elements, and a compressive load is selected. Initially, these geometric variables/values are selected by hypothesis, but will be tested in the subsequent analysis. Furthermore, the compressive load may be delimited by the means selected for applying such load. For example, when using a threaded bolt and nut, the tensile strength of the bolt or shear strength of the threads may be a delimiting factor. Subsequently, in step 74, the nominal compressive stress $\sigma_{comp}$ or pressure acting on the contact area is calculated by dividing the compressive load by the total contact area. Next, in decision step 76, the nominal compressive stress $\sigma_{comp}$ is divided by the Young's Modulus E of the material intended to be elastically deformed, e.g., the locking washer, to calculate a nominal compressive strain $\epsilon$. Those skilled in the art will recognize that the strain at the edge of the groove will be significantly larger, i.e., about seven (7) times larger, than the compressive strain intermediate the edges, and must be factored when determining the nominal compressive strain $\epsilon$. In step 78, if the nominal compressive strain $\epsilon$ is less than 0.0005 inch/inch, then steps 72–78 are repeated using a different set of geometric variables/values. If an affirmative conclusion is reached then, in decision step 80, the calculated compressive stress $\sigma_{COMP}$ is compared to the yield strength $\sigma_{YIELD}$ of the materials. If the yield strength $\sigma_{YIELD}$ is less than the compressive stress $\sigma_{COMP}$, then steps 72–80 are repeated using a different set of geometric variables/values. Upon determining that the calculated compressive stress $\sigma_{COMP}$ is less than the yield strength $\sigma_{YIELD}$ of the materials, then, in step 82, the torque reacting capability $T_{SI}$ of the structural interlock is determined. Depending upon the geometry of the mating elements, equations 1.0, 2.0 and 3.0, may be used to analyze the structural interlock. Finally, in step 84, the torque reacting capability $T_{SI}$ of the structural interlock is compared to the torque load requirements $T_{REQ}$. If the torque reacting capability $T_{SI}$ is inadequate, then steps 72–84 are repeated using yet another set of geometric variables/values. When all of the above criteria, have been satisfied, then the structural interlock is deemed to be acceptable for the torque load requirements.

For ease of discussion, only one of the serially-arranged structural interlocks 40 were described, though, as indicated earlier, the locking washer 42 and the cold-worked bushing 44 produce yet another structural interlock 40. The grooves 50 are formed in the face of the cold-worked bushing 44 such that the locking washer 42 may be elastically deformed into grooves 50. Here again, it should be mentioned that the locking washer 42 is employed as a sacrificial member to prevent damage to the inner race 20 of the elastomeric bearing 10 or to the cold-worked bushing 44.

The structural interlock 40 of the present invention exhibits the attributes of both frictional engagement and mechanical interference while facilitating assembly, repair and/or maintenance. Furthermore, mechanical interference is produced without permanently deforming any of the mating elements, i.e., the inner race 20, the locking washer 42, or the cold-worked bushing 44. More specifically, the structural interlock 40 is engaged by the simple action of applying torque to the connecting bolt 28. Furthermore, by creating a large, well-defined mating plane $M_P$, elastic deformation of material into the grooves and mechanical interference produced thereby are repeatable and predictable. Moreover, the mating elements are reusable and do not require rework following disassembly. It will be recalled that prior art causes plastic deformation of the cold-worked bushing which requires removal and replacement thereof following any instant of repair or maintenance.

Although the invention has been shown and described with respect to exemplary embodiments thereof, it should be understood by those skilled in the art that other changes, omissions and additions may be made therein and thereto, without departing from the spirit and scope of the present invention. For example, while the exemplary embodiments of the present invention have been described in the context of a clevis joint, it will be appreciated that the teachings herein may be applied to any structural arrangement wherein an anti-rotation feature is desired. Furthermore, while the exemplary embodiments depict a structural interlock for an elastomeric bearing, it will be appreciated that the teachings described herein are generally applicable to bearing assemblies. Moreover, while the exemplary embodiments depict a pair of serially-arranged structural interlocks, it will be appreciated that only a single structural interlock may be employed to effect the necessary engagement between mating elements. Furthermore, while the described embodiment depicts a locking washer 42 as a sacrificial member between the elastomeric bearing 10 and the cold-worked bushing 44, it should be appreciated that the inner race 20 of the elastomeric bearing 10 may mate directly with the cold-worked bushing 44. As such, either element may include radial grooves such that portions of the other element are elastically deformed in accordance with the teaching herein. Finally, while the preferred embodiment describes a cold-worked bushing, it should be understood that the invention has utility with bushings of any variety.

What is claimed is:

1. A structural interlock (40) for inhibiting relative rotation between mating elements (20, 42), the elements (20, 42)

defining a contact area ($A_1$ thru $A_8$) therebetween and each defining a material yield strength the structural interlock (40) being characterized by:

at least one of the mating elements having a plurality of grooves (50) formed therein; and means (60) for producing a nominal contact pressure on the contact area ($A_1$ thru $A_8$), said contact pressure elastically deforming the other of the mating elements into the grooves (50), and said contact pressure being less than the material yield strength of one of the mating elements, wherein the at least one of the mating elements is an inner race (20) of an elastomeric bearing (10) and the other of the mating elements is a locking washer (42).

2. A structural interlock (40) for inhibiting relative rotation between mating elements (20, 42), the mating elements (20, 42) defining a contact area ($A_1$ thru $A_8$) therebetween and each defining a material yield strength, the structural interlock (40) being characterized by:

at least one of the mating elements having a plurality of grooves (50) formed therein; and means (60) for producing a nominal contact pressure on the contact area ($A_1$ thru $A_8$), said contact pressure elastically deforming the other of the mating elements into the grooves (50), and said contact pressure being less than the material yield strength of one of the mating elements, wherein the at least one of the mating elements is an inner race (20) of an elastomeric bearing (10), wherein the other of the mating elements is a locking washer (42) and wherein the contact pressure means (60) is a bolt (28) extending through said inner race (20) and said locking washer (42), and a nut (60) for threadably engaging the bolt (28) to apply a compressive load on the contact area ($A_1$ thru $A_8$).

3. The structural interlock according to claim 2 wherein the structural interlock comprises a clevis joint comprising:

a first component part (14) including a pair of lugs (30) extending therefrom, each lug having an opening; and a second component part (16) having integrally formed in combination therewith:
(i) an elastomer bearing (10) comprising the inner race (20);
(ii) an outer race (22); and
(iii) and a plurality of alternating layers of elastomer and non-resilient shims (24,26).

4. The structural interlock according to claim 3 wherein the inner race (20) is disposed about the bolt (28) which is mounted transversely through the openings in the pair of lugs and extends between the pair of lugs (30);

the structural interlock further comprising a sleeve (66) disposed and in contact with between the bolt (28) and at least one of the lugs (30), wherein the sleeve (66) is in contact with both the bolt (28), said at least one of the lugs (30) and the inner race (20).

5. A structural arrangement for inhibiting relative rotation between an inner race (20) of an elastomeric bearing (10) and a bushing (44) disposed in combination with a lug (30) of a clevis joint, the structural arrangement comprising:

a locking washer (42) disposed between the inner race (20) and the bushing (44), said locking washer (42) and the inner race (20) defining a contact area ($A_1$ thru $A_8$), and said locking washer (42) and the bushing (44) defining a contact area ($A_1$ thru $A_8$), said locking washer (42), inner race (20) and bushing (44) defining the mating elements (42, 20, 44);

said inner race (20) and said bushing (44) each having a plurality of grooves (50) formed therein; and means (60) for producing a nominal contact pressure on the contact areas ($A_1$ thru $A_8$), said contact pressure elastically deforming the locking washer (42) into the grooves (50) of the inner race (20) and bushing (44), and said contact pressure being less than the material yield strength of the mating elements (42, 20, 44).

6. The structural arrangement according to claim 5 wherein the nominal contact pressure is about 80% of the material yield strength of the locking washer (42).

7. The structural arrangement according to claim 5 wherein the material yield strength of locking washer (42) is lower that the material yield strength of the inner race (20) and lower than the material yield strength of the bushing (44).

8. The structural arrangement according to claim 5 wherein the inner race (20) and the bushing (44) each define an even number of grooves (50).

9. The structural arrangement according to claim 5 wherein the inner race (20) and the bushing (44) each an even number of radially oriented grooves (50).

10. The structural arrangement according to claim 5 wherein the contact pressure means (60) is a bolt (28) extending through said inner race (20) and said locking washer (42), and a nut (60) for threadably engaging the bolt (28) to apply a compressive load on the contact area ($A_1$ thru $A_8$).

* * * * *